United States Patent [19]

Okada et al.

[11] Patent Number: 4,894,412
[45] Date of Patent: Jan. 16, 1990

[54] PROCESS FOR PREPARING SELF-CROSSLINKABLE AMINOSILOXANE EMULSION

[75] Inventors: Fumio Okada, Takasaki; Masaki Tanaka; Hiroshi Ohashi, both of Annaka, all of Japan

[73] Assignee: Shin-Etsu Chemical Co., Ltd., Tokyo, Japan

[21] Appl. No.: 195,650

[22] Filed: May 18, 1988

[30] Foreign Application Priority Data

May 19, 1987 [JP] Japan ................................ 62-121985

[51] Int. Cl.$^4$ ............................................... C08K 5/16
[52] U.S. Cl. ..................................... 524/714; 524/755; 524/773; 524/774
[58] Field of Search ................ 524/755, 773, 774, 714

[56] References Cited

U.S. PATENT DOCUMENTS 3,849,359 11/1974 Nitzsche et al. ..................... 524/755
4,228,054 10/1980 Ona et al. ............................ 5214/714

*Primary Examiner*—Melvyn I. Marquis
*Attorney, Agent, or Firm*—Oblon, Spivak, McClelland, Maier & Neustadt

[57] ABSTRACT

A process for preparing a self-crosslinkable aminosiloxane emulsion, comprising:

dispersing by emulsification in water in the presence of a cationic surface active agent and a nonionic surface active agent:
  (A) a specific organosilicon compound that may have a hydroxyl group and/or an alkoxy group;
  (B) a specific organosilicon compound having a nitrogen-containing monovalent hydrocarbon group; and
  (C) a specific organosilane having a hydroxyl group and/or an alkoxy group, and or a partial hydrolysis-condensation product thereof;

subsequently carrying out emulsion polymerization in the presence of an alkaline catalyst; and thereafter neutralizing the reaction product.

The resulting emulsion is useful as softening agents, smoothing agents or feeling improver for all sorts of textiles, and binders between fibers.

13 Claims, No Drawings

PROCESS FOR PREPARING SELF-CROSSLINKABLE AMINOSILOXANE EMULSION

BACKGROUND OF THE INVENTION

1. Field of the Invention

This invention relates to a process for preparing a self-crosslinkable aminosiloxane emulsion, and more particularly, to a process for preparing an aminosiloxane emulsion that is useful as fiber treatment agents, release agents, polishing agents, etc. and that can impart good softness, smoothness, film-forming properties, etc. to textiles.

2. Description of the Prior Art

A method for preparing by emulsion polymerization aminoorganopolysiloxane emulsions having self-crosslinkability which can be used as fiber treatment agents, is known in which a cyclic organopolysiloxane and a trialkoxysilane containing an amino group are subjected to emulsion copolymerization (Japanese Patent Publication (KOKOKU) No. 38609/1981). In this method, an aminoalkyl group that imparts softness, smoothness, etc. to textiles and an alkoxy group that imparts self-crosslinkability to the emulsion are introduced by the trialkoxysilane, and therefore there has been involved the disadvantage that these two properties can not be independently controlled. For example, an attempt to introduce the amino group in a large amount necessarily follows a large amount of the alkoxy group, making the emulsion liable to undergo gelation owing to hydrolysis and condensation.

Also, fiber treatment agents chiefly comprised of aminosiloxane (disclosed in Japanese Patent Publication (KOKOKU) Nos. 1480/1973 and 43617/1979) tend to cause color changes due to the oxidation of aminoalkyl groups contained in the aminosiloxanes adhered to textiles when they are dried by heating in a treatment process or while the textiles are stocked after treatment. In particular, there is seen the so-called "yellowing" phenomenon that a color tone turns yellow if the textiles are of white or pale color types, and thus has been involved a great disadvantage that the commercial value of the textiles that ought to be nearly pure white by nature is lowered.

SUMMARY OF THE INVENTION

Accordingly, an object of this invention is to provide a process for preparing a self-crosslinkable aminosiloxane emulsion that makes it possible to arbitrarily set the number of amino groups possessed by an aminosiloxane polymer and the degree of the self-crosslinkability, and which does not easily undergo yellowing when used in textiles.

Thus, this invention provides a process for preparing a self-crosslinkable aminosiloxane emulsion, comprising;

dispersing by emusification in water in the presence of a cationic surface active agent and a nonionic surface active agent;

(A) an organosilicon compound represented by General Unit Formula (I):

$$R_a^1 R_b^2 SiO_{\frac{4-(a+b)}{2}} \quad (I)$$

wherein $R^1$ represents a monovalent hydrocarbon group having 1 to 20 carbon atoms; $R^2$ has the same definition as $R^1$ or represents a group represented by the formula: $-OX$, where X represents a hydrogen atom or a monovalent hydrocarbon group having 1 to 6 carbon atoms; and a represents a number of $0 < a \leq 3$ and b represents a number of $0 \leq b < 3$, satisfying $1 \leq a+b \leq 3$;

(B) an organosilicon compound represented by General Unit Formula (II):

$$R_c^3 R_d^2 SiO_{\frac{4-(c+d)}{2}} \quad (II)$$

wherein $R^3$ represents a monovalent hydrocarbon group containing a nitrogen atom; $R^2$ is as defined above; and c represents a number of $0 < c \leq 3$ and d represents a number of $0 \leq d < 3$, satisfying $1 \leq c+d \leq 3$; and (C) at least one selected from the group consisting of an organosilane represented by General Formula (III):

$$R^1 Si(OX)_3 \quad (III)$$

wherein $R^1$ and X are as defined above, and a partial hydrolysis-cndensation product thereof; subsequently carrying out emulsion polymerization in the presence of an alkaline catalyst; and thereafter neutralizing the reaction mixture.

The self-crosslinkable aminosiloxane emulsion obtained by the preparation process of this invention makes it possible to arbitrarily set the number of amino groups possessed by an aminosiloxane polymer and the degree of the self-crosslinkability, has good film-forming properties, also can effectively impart softness, smoothness, good feeling, etc. to textiles thereby treated, and further may undergo the yellowing in the textiles with difficulty.

The self-crosslinkable aminosiloxane emulsion obtained by the preparation process of this invention is useful as softening agents, smoothing agents or feeling improvers for all sorts of natural fibers, synthetic fibers and woven fabrics or unwoven fabrics thereof, or inorganic fibers such as glass fiber, rock wool and asbestos, and binders between fibers, and besides these, also useful as release agents and polishing agents for all sorts of molded products, antifoaming agents, and components for coating materials.

DETAILED DESCRIPTION OF THE INVENTION

In General Unit Formula (I) representing Component (A) organosilicon compound used in this invention, $R^1$ represents a monovalent hydrocarbon group having 1 to 20 carbon atoms, and examples thereof may include alkyl groups such as a methyl group, an ethyl group, a propyl group, a butyl group, an octyl group, a lauryl group and a stearyl group; alkenyl groups such as a vinyl group and an allyl group; aryl groups such as a phenyl group, a tolyl group and a naphthyl group; aralkyl groups such as a 2-phenylethyl group; cycloalkyl groups such as a cyclopentyl group and a cyclohexyl group; and those in which part or all of the hydrogen atoms bonded to carbon atoms of these groups have been substituted with one or more of a halogen atom (as exemplified by a fluorine atom, a chlorine atom, and a bromine atom), a cyano group, a mercapto group, etc., as exemplified by a 3,3,3-trifluoropropyl group, a cyanopropyl group, a mercaptopropyl group, etc. $R^2$ have the same definition as $R^1$ or represents a group represented by the formula: —OX, where X represents a hydrogen atom or a monovalent hydrocarbon group having 1 to 6 carbon atoms. Example of the monovalent hydrocarbon group having 1 to 6 carbon atoms may include alkyl groups such as a methyl group, an ethyl group, a propyl group and a butyl group; alkenyl group such as a vinyl group and an allyl group; aryl groups such as a phenyl group; and those in which part or all of the hydrogen atoms bonded to carbon atoms of these groups have been substituted with one or more of a halogen atom (as exemplified by a fluorine atom, a chlorine atom, and a bromine atom), a cyano group, etc., as exemplified by a 3,3,3-trifluoropropyl group, a cyanopropyl group, etc. Symbol a represents a number of $0 < a \leq 3$ and b represents a number of $0 \leq b < 3$, satisfying $1 \leq a+b \leq 3$. This Component (A) organosilicon compound may be any of straight-chain, branched or cyclic compounds, or further may be a mixture of these. Such organosilicon compound may include, for example, a dimethylpolysiloxane represented by the formula:

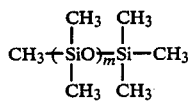

(where m is a positive integer); a dimethylpolysiloxane containing a hydroxyl group as a terminal group, represented by the formula:

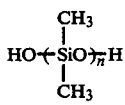

(where n is a positive integer); a dimethylpolysiloxane containing an alkoxy group as a terminal group, represented by the formula:

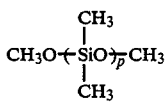

(where p is a positive integer); a cyclic dimethylpolysiloxane represented by the formula:

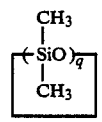

(where q is an integer of 3 to 10); and an organopolysiloxane represented by the formula:

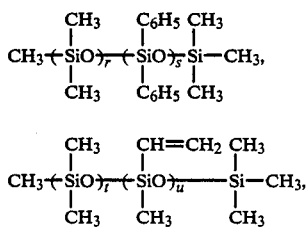

or

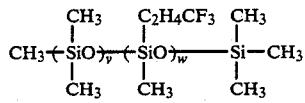

(In the formulas, r, s, t, u, v and w are each a positive integer).

Of these, preferred is the cyclic dimethylpolysiloxane represented by the formula:

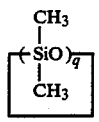

(where q is an integer of 3 to 10).

In General Unit Formula (II) representing Component (B) organosilicon compound used in the process of this invention, $R^3$ represents a monovalent hydrocarbon group containing a nitrogen atom, and preferably represents an amino alkyl group represented by the formula:

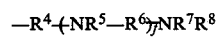

where $R^4$ and $R^6$ each represent an alkylene group such as a methylene group, an ethylene group, a trimethylene group, a tetramethylene group and a hexamethylene group, or a divalent hydrocarbon group having 1 to 6 carbon atoms, such as a phenylene group; $R^5$, $R^7$ and $R^8$ each represent a hydrogen atom or have the same definition as $R^1$ in General Unit Formula (I); and f represents an integer of 0 to 3. Symbol c represents a number of $0 < c \leq 3$ and d represents a number of $0 \leq d < 3$, satisfying $1 \leq c+d \leq 3$. The Component (B) organosilicon compound may be any of straight-chain, branched or cyclic compounds, or further may be a mixture of these.

Such organosilicon compound may include, for example, an aminosiloxane represented by the formula:

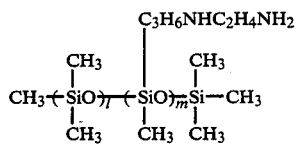

(where l and m each are a positive integer); an aminosiloxane containing a hydroxyl group as a terminal group, represented by the formula:

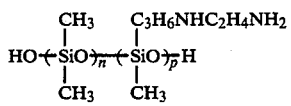

(where n and p each are a positive integer); an aminosiloxane containing an alkoxy group as a terminal group, represented by the formula:

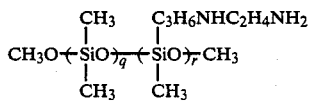

(where q and r each are a positive integer); an alkyldialkoxysilane represented by the formula:

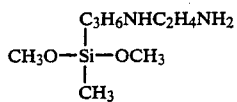

and a partial hydrolysis-condensation product thereof; a cyclic aminosiloxane represented by the formula:

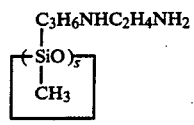

(where s is a positive integer); and an organopolysiloxane containing an aminoalkyl group represented by the formula:

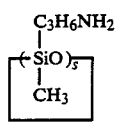

(where s is a positive integer),

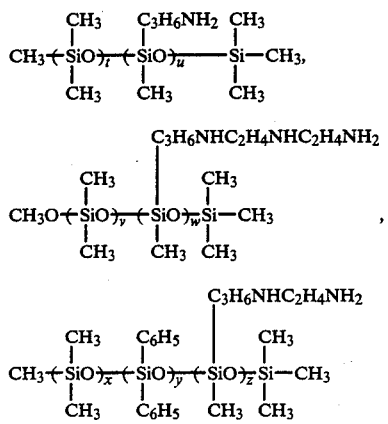

(In the formulas, t, u, v, w, x, y and z each are a positive integer.), etc. Of these, preferred is the one represented by the formula:

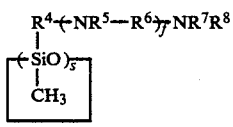

(wherein f is an integer of 0 to 3, and s is an integer of 3 to 10).

There is no particular limitation on the amount of this Component (B) organosilicon compound to be used, but, in order to impart the properties such as softness and smoothness to textiles, may preferably be in the range of form 0.1 to 30 parts by weight based on 100 parts by weight of the Component (A) organosilicon compound.

The Component (C) organosilane used in the preparation process of this invention is represented by General Formula (III) set forth above, and may specifically include, for example, $CH_3Si(OCH_3)_3$, $CH_3Si(OC_2H_5)_3$, $C_6H_5Si(OCH_3)_3$, $CH_2=CHSi(OCH_3)_3$,

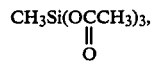

$ClC_3H_6Si(OCH_3)_3$,

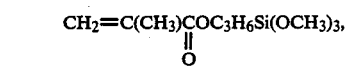

$CF_3C_2H_4Si(OCH_3)_3$, and the like, and partial hydrolysis-condensation products of these may also be used without any difficulty. The partial hydrolysis-condensation product of the organosilane of General Formula (III) herein means a compound in which the groups —OX in General Formula (III) have been partially hydrolyzed to form silanol groups and the silanol groups have then been condensed at least in part. There is no particular limitation on the amount of this organosilane and/or the partial hydrolysis-condensation product thereof to be used, but if the amount is too small, the self-crosslinkability is diminished, thus worsening the film-forming properties, and an overly large amount may result in loss of the stability of emulsions because of reactivity. Accordingly, the amount may preferably be in the range of from 0.1 to 30 parts by weight based on 100 parts by weight of the Component (A) organosilicon compound.

In the process of this invention, the above components (A) to (C) are first dispersed by emulsification in water in the presence of a cationic surface active agent and a nonionic surface active agent.

In this step, a cationic surface active agent and a nonionic surface active agent are required to be used in combination in order to improve the emulsified state of the system and to improve stability such as storage stability, dilution stability and mechanical stability of the emulsion after emulsion polymerization. If the cationic surface active agent is not used, the subsequent emulsion polymerization reaction may not proceed, and if the nonionic surface active agent is not used, the stability of emulsion after emulsion polymerization is lowered. The reason therefor has not necessarily been made clear, but presumably be that the cationic surface active agent is an essential component for promoting the contact of an alkaline material present in water as an emulsion polymerization catalyst with the above described respective components (A), (B) and (C) in emulsion particles to cause the polymerization in the polymerization step described below. On the other hand, the nonionic surface active agent is presumed to have the action of protecting the alkoxy group of the Component (C) organosilane, thus enhancing the stability of emulsions during the emulsion polymerization and after the emulsion polymerization.

The cationic surface active agent to be used may include, for example, alkyltrimethyl ammonium chlorides, alkylbenzyl ammonium chlorides, dialkyldimethyl ammonium chlorides, alkyltrimethyl ammonium bromides, and the like, but is by no means limited to these, and also may be used in combination of two or more of them. This cationic surface active agent may preferably be used in an amount ranging from 0.5 to 50 parts by weight, particularly preferably from 1 to 30 parts by weight, based on 100 parts by weight of Component (A). An overly small amount may not result in a sufficiently emulsified state, taking a long time for the polymerization, and an overly large amount may result in presence of an unnecessary amount of the emulsifying agent to make non-homogeneous the film to be formed by drying the resulting emulsion, lowering the film properties.

On the other hand, the nonionic surface active agent may include, for example, polyoxyethylene alkyl ethers, polyoxyethylene alkylphenyl ethers, polyoxyethylene alkyl esters, sorbitan fatty acid esters, polyoxyethylene sorbitan fatty acid esters, sucrose fatty acid esters, etc., but is by no means limited to these, and also may be used in combination of two or more of them. This nonionic surface active agent may preferably be used in an amount ranging from 0.01 to 30 parts by weight, particularly preferably from 0.05 to 10 parts by weight, based on 100 parts by weight of Component (A). An overly small amount of the nonionic surface active agent may result in poor stability of the emulsion during the emulsion polymerization and after the emulsion polymerization, and an overly large amount may result in presence of an unnecessary amount of the emulsifying agent to make non-homogeneous the film to be formed by drying the resulting emulsion, lowering the film properties.

The amounts of the cationic surface active agent and anionic surface active agent described above may preferably be determined in view of the stability of the emulsion, the hydrophilic nature, thermal resistance or the like of a composition obtained after the emulsion polymerization, and also the properties of the film to be formed.

The emulsification of the above components (A) to (C) in water with use of the above-described surface active agents is carried out by homogeneously dispersing the respective components of (A), (B) and (C) in water together with given amounts of the cationic surface active agent and nonionic surface active agent, using a homomixer, a colloid mill, a homogenizer or the like. There is no particular limitation in the amount of water used at this time, but it may be usually used in the range of from 100 to 1,000 parts by weight based on 100 parts parts by weight of Component (A).

In the process of this invention, an emulsified dispersion obtained by the above step and comprising the components (A), (B) and (C) is subjected to the emulsion polymerization in the presence of an alkaline catalyst.

The alkaline catalyst used here include, for example, sodium hydroxide, potassium hydroxide, rubidium hydroxide, sodium carbonate, tetraalkyl ammonium hydroxides, etc. There is no particular limitation on the amount of the this alkaline catalyst to be used, but it may appropriately be in the range of from 0.1 to 10 parts by weight based on 100 parts by weight of Component (A).

In carrying out the emulsion polymerization, the alkaline catalyst may be added in the emulsified dispersion obtained in the previous step and the polymerization may be allowed to proceed with stirring, approximately for several hours to a week at suitable temperatures of from 20° to 80° C.

After completion of the above polymerization, the reaction mixture is neutralized. Acidic materials used for the neutralization may include organic acid and inorganic acid such as hydrochloric acid, sulfuric acid, phosphoric acid, formic acid, acetic acid, lauric acid, stearic acid, glycolic acid. Of these, preferred are lower organic acids such as formic acid and acetic acid in view of the capability of enhancing the film-forming properties, i.e., self-crosslinkability, of the resulting emulsion, and also phosphoric acid in view of the capability of suppressing the yellowing of the goods due to treatment with aminosiloxanes which has been hitherto regarded as a disadvantage. These acidic materials, which act as a neutralizing agent and a crosslinking catalyst when they are lower organic acids, may preferably be used in an amount of 1.1 times or more, particularly preferably from 1.5 to 5 times the equivalent weight, based on the above alkaline catalyst. When phosphoric acid is used, it is required to be used in the range of from 0.1 to 10 times the equivalent weight, based on the amino groups in the Component (B) organosilicon compound. An overly small amount may bring about no effect of suppressing the yellowing, and an overly large amount may cause phosphoric acid to remain in the dried film to lower the film properties.

The emulsion obtained by the process of this invention described above can be used for various purposes as it is, but there may be optionally added other aqueous treating agents as exemplified by softening agents, water repellents, moisture absorption processing agents, antistatic agents, flame-retardants, etc.

EXAMPLES

This invention will be described below in greater detail.

EXAMPLE 1

Used were the following materials:

| Component (a): | Octamethylcyclotetrasiloxane | 300 g |
|---|---|---|
| Component (b): | A cyclic aminosiloxane represented by the formula:<br>$$\left[ \begin{array}{c} C_3H_6NHC_2H_4NH_2 \\ | \\ SiO \\ | \\ CH_3 \end{array} \right]_n$$<br>[where n is an integer of 3 to 6 (a mixture)] | 3 g |
| Component (c): | Methyltrimethoxysilane | 3 g |
| Component (d): | Lauryltrimethyl ammonium chloride | 30 g |
|  | Polyoxyethylene nonylphenyl ether | 3 g |
| Component (e): | Potassium hydroxide | 1 g |
| Component (f): | Acetic acid | 2 g |
|  | Phosphoric acid | 0.2 g |

The above components (a), (b) and (c) were charged in a 2 lit. glass beaker, and homogeneously mixed by means of a homomixer, followed by addition of Component (d) and 641 g of water and then dispersion to effect homogeneously emulsification. Next, in the resulting emulsified products, a solution obtained by dissolving the above Component (e) in 19 g of water was added, and thereafter the polymerization was carried out with heating for 72 hours at 70° C., followed by neutralization with use of Component (f) to prepare an emulsion. The emulsion thus obtained contained 29.8% by weight of non-volatile components after it was maintained for 3 hours at 105° C., and its residue was found to be a white and flexible rubbery film.

In a treatment solution obtained by diluting 3 g of the resulting emulsion with 97 g of water, a polyester/cotton (65/35) blended broad cloth (white) was dipped, and thereafter squeezed by means of a mangle with a wet pickup of 100%, followed by drying for 2 minutes at 100° C. and then curing for 2 minutes at 150° C. The feeling of the resulting treated cloth was evaluated by use of a Uenoyama's Feeling Meter and by touch. Also, occurence or no occurence of color change was visually confirmed. Results obtained are shown in Table 1.

EXAMPLE 2

Used were the following materials:

| | | |
|---|---|---|
| Component (a): | Octamethylcyclotetrasiloxane | 300 g |
| Component (b): | A cyclic aminosiloxane represented by the formula: $$\left[\begin{array}{c} C_3H_6NH_2 \\ | \\ -(SiO)_{\overline{n}}- \\ | \\ CH_3 \end{array}\right]$$ [where n is an integer of 3 to 6 (a mixture)] | 10 g |
| Component (c): | Methyltrimethoxysilane | 10 g |
| Component (d): | Lauryltrimethyl ammonium chloride | 30 g |
| | Polyoxyethylene lauryl ether | 3 g |
| Component (e): | Potassium hydroxide | 1 g |
| Component (f): | Acetic acid | 2 g |
| | Phosphoric acid | 0.5 g |

The above components (a), (b) and (c) were charged in a 2 lit. glass beaker, and homogeneously mixed by means of a homomixer, followed by addition of Component (d) and 627 g of water and then dispersion to effect homogeneously emulsification. Next, in the resulting emulsified product, a solution obtained by dissolving the above Component (e) in 19 g of water was added, and thereafter the polymerization was carried out with heating for 40 hours at 80° C., followed by neutralization with use of Component (f) to prepare an emulsion. The emulsion thus obtained contained 31.1% by weight of non-volatile components after it was maintained for 3 hours at 105° C., and its residue was found to be a white rubbery film with strongly elastic feeling.

Using the resulting emulsion, the feeling was evaluated in the same manner as in Example 1. Results obtained are shown in Table 1.

EXAMPLE 3

Used were the following materials:

| | | |
|---|---|---|
| Component (a): | Dimethylpolysiloxane containing a hydroxyl group as a terminal group and having a viscosity of 50 cSt at 25° C. | 300 g |
| Component (b): | A cyclic aminosiloxane represented by the formula: $$\left[\begin{array}{c} C_3H_6NH_2 \\ | \\ -(SiO)_{\overline{n}}- \\ | \\ CH_3 \end{array}\right]$$ [where n is an integer of 3 to 10] | 10 g |
| Component (c): | Phenyltrimethoxysilane | 3 g |
| Component (d): | Benzyltrimethyl ammonium chloride | 30 g |
| | Polyoxyethylene nonylphenyl ether | 3 g |
| Component (e): | Potassium hydroxide | 1 g |
| Component (f): | Acetic acid | 2 g |
| | Phosphoric acid | 0.5 g |

The above components (a), (b) and (c) were charged in a 2 lit. glass beaker, and homogeneously mixed by means of a homomixer, followed by addition of Component (d) and 634 g of water and then dispersion to effect homogeneously emulsification. Next, in the resulting emulsified product, a solution obtained by dissolving the above Component (e) in 19 g of water was added, and thereafter the polymerization was carried out with heating for 72 hours at 70° C., followed by neutralization with use of Component (f) to prepare an emulsion. The emulsion thus obtained contained 30.4% by weight of non-volatile components after it was maintained for 3 hours at 105° C., and its residue was found to be a white and flexible rubbery film.

Using the resulting emulsion, the feeling was evaluated in the same manner as in Example 1. Results obtained are shown in Table 1.

EXAMPLE 4

Example 2 was repeated to prepare an emulsion, except that the Component (f) phosphoric acid was not used. The emulsion thus obtained contained 30.9% by weight of non-volatile components after it was maintained for 3 hours at 105° C., and its residue was found to be a yellow rubbery film with elastic feeling.

Using the resulting emulsion, the feeling was evaluated in the same manner as in Example 1. Results obtained are shown in Table 1.

COMPARATIVE EXAMPLE 1

Example 2 was repeated to prepare an emulsion, except that the Component (C) methyltrimethoxysilane was not used and the amount of water was changed to 637 g. The emulsion thus obtained contained 30.2% by weight of non-volatile components after it was maintained for 3 hours at 105° C., and its residue was white and of uncrosslinked raw rubber nature.

Using the resulting emulsion, the feeling was evaluated in the same manner as in Example 1. Results obtained are shown in Table 1.

COMPARATIVE EXAMPLE 2

Example 2 was repeated to prepare an emulsion, except that the Component (b) cyclic aminosiloxane used in Example 2 was not used and the amount of water was changed to 637 g. The emulsion thus obtained contained 30.0% by weight of non-volatile components after it was maintained for 3 hours at 105° C., and its residue was found to be a white rubbery film.

Using the resulting emulsion, the feeling was evaluated in the same manner as in Example 1. Results obtained are shown in Table 1.

COMPARATIVE EXAMPLE 3

Polymerization was carried out in the same manner as in Example 2, except that the polyoxyethylene lauryl ether in Component (d) was not used and the amount of lauryltriethyl ammonium chloride was changed to 33 g. As a result, gel-like products started to adhere in the form of a ring at the site of liquid surface on the wall of the container. Example 2 was thereafter repeated to prepare an emulsion. The gel-like products were present in a large quantity also in the emulsion thus obtained. This gel-like products were filtered with gauze and removed to obtain an emulsion containing only 23.7% by weight of non-volatile components after it was maintained for 3 hours at 105° C., and its residue was also white and of uncrosslinked raw rubber nature.

Using the resulting emulsion, the feeling was evaluated in the same manner as in Example 1. Results obtained are shown in Table 1.

TABLE 1

| Example | Softness | Evaluation by touch; yellowing |
|---|---|---|
| 1 | 20 | soft and resilient feeling; no yellowing |
| 2 | 23 | soft and strongly resilient feeling; no yellowing |
| 3 | 20 | soft and resilient feeling; no yellowing |
| 4 | 23 | soft and strongly resilient feeling; slight yellowing |
| Comparative Example | | |
| 1 | 21 | soft, but no resilient feeling; no yellowing |
| 2 | 30 | Lack in softness, but resilient feeling; no yellowing |
| 3 | | (Gel-like products formed in the stored emulsion) |
| Control (non-treated cloth) | 36 | No softness, and coarse and hard feeling |

*softness: Folding resistance (g/cm) was measured with use of Uenoyama's Feeling Meter

What is claimed is:

1. A process for preparing a self-crosslinkable aminosiloxane emulsion, comprising:
dispersing by emulsification in water in the presence of a cationic surface active agent and a nonionic surface active agent;
(A) an organosilicon compound represented by formula (I):

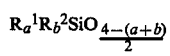
$$R_a^1 R_b^2 SiO_{\frac{4-(a+b)}{2}} \quad (I)$$

wherein $R^1$ represents a monovalent hydrocarbon group having 1 to 20 carbon atoms; $R^2$ has the same definition as $R^1$ or represents a group represented by the formula: —OX, where X represents a hydrogen atom or a monovalent hydrocarbon group having 1 to 6 carbon atoms; and a represents a number of $0 < a \leq 3$ and b represents a number of $0 \leq b < 3$, satisfying $1 \leq a + b \leq 3$;

(B) an organosilicon compound represented by formula (II):

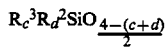
$$R_c^3 R_d^2 SiO_{\frac{4-(c+d)}{2}} \quad (II)$$

wherein $R^3$ represents a monovalent hydrocarbon group containing a nitrogen atom; $R^2$ is as defined above; and c represents a number of $0 < c \leq 3$ and d represents a number of $0 \leq d < 3$, satisfying $1 \leq c + d \leq 3$; and (C) at least one member selected from the group consisting of an organosilane represented by formula (III):

$$R^1 Si(OX)_3 \quad (III)$$

wherein $R^1$ and X are as defined above, and a partial hydrolysis-condensation product thereof;
subsequently carrying out emulsion polymerization in the presence of an alkaline catalyst selected from the group consisting of sodium hydroxide, potassium hydroxide, rubidium hydroxide, sodium carbonate and tetraalkyl ammonium hydroxides; and thereafter neutralizing the reaction mixture with an acid selected from the group consisting of organic acids and inorganic acids.

2. The process according to claim 1, wherein said Component (A) is a cyclic dimethylpolysiloxane represented by the formula:

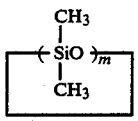

wherein m is an integer of 3 to 10.

3. The process according to claim 1, wherein the nitrogen-containing monovalent hydrocarbon group $R^3$ possessed by said Component (B) represents an amino alkyl group represented by the formula:

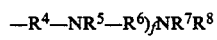
$$-R^4-NR^5-R^6)_f NR^7 R^8$$

wherein $R^4$ and $R^6$ each represent a divalent hydrocarbon group having 1 to 6 carbon atoms; $R^5$, $R^7$ and $R^8$ each represent a hydrogen atom or have the same definition as $R^1$ in General Unit Formula (I); and f represents an integer of 0 to 3.

4. The process according to claim 1, wherein said Component (B) is an organosilicon compound represented by the formula:

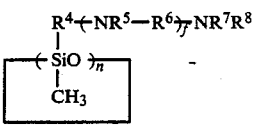

wherein $R^4$ and $R^6$ each represent a divalent hydrocarbon group having 1 to 6 carbon atoms; $R^5$, $R^7$ and $R^8$ may be the same or different and each represents a hydrogen atom or a monovalent hydrocarbon group having 1 to 20 carbon atoms; and f is an integer of 0 to 3, and n is an integer of 3 to 10.

5. The process according to claim 1, wherein said Component (B) is present in an amount of from 0.1 to 30 parts by weight based on 100 parts by weight of Component (A).

6. The process according to claim 1, wherein said Component (C) is present in an amount of from 0.1 to 30 parts by weight based on 100 parts by weight of Component (A).

7. The process according to claim 1, wherein said cationic surface active agent is present in an amount of from 0.5 to 50 parts by weight based on 100 parts by weight of Component (A).

8. The process according to claim 1, wherein said nonionic surface active agent is present in an amount of from 0.01 to 30 parts by weight based on 100 parts by weight of Component (A).

9. The process according to claim 1, wherein said alkaline catalyst is present in an amount of from 0.1 to 10 parts by weight based on 100 parts by weight of Component (A).

10. The process according to claim 1, wherein said reaction mixture is neutralized with a lower organic acid or phosphoric acid.

11. The process according to claim 10, wherein said lower organic acid is formic acid or acetic acid.

12. The process according to claim 10, wherein said lower organic acid is present in an amount of 1.1 times or more the equivalent weight based on said alkaline catalyst.

13. The process according to claim 10, wherein phosphoric acid is present in the range of from 0.1 to 10 times the equivalent weight based on amino groups contained in said Component (B).

* * * * *